(12) United States Patent
Tully

(10) Patent No.: US 7,613,723 B2
(45) Date of Patent: Nov. 3, 2009

(54) CONFIGURABLE FRAMEWORK FOR STORING AND RETRIEVING ARBITRARY INFORMATION FROM A DATABASE

(75) Inventor: Ricky Dale Tully, Katy, TX (US)

(73) Assignee: Ryan Levacy, Austin, TX (US)

( * ) Notice: Subject to any disclaimer, the term of this patent is extended or adjusted under 35 U.S.C. 154(b) by 207 days.

(21) Appl. No.: 11/681,029

(22) Filed: Mar. 1, 2007

(65) Prior Publication Data

US 2007/0156662 A1    Jul. 5, 2007

Related U.S. Application Data

(63) Continuation of application No. 10/702,880, filed on Nov. 6, 2003, now abandoned.

(51) Int. Cl.
*G06F 17/30* (2006.01)
(52) U.S. Cl. .................. 707/102; 707/100; 707/101; 704/10; 706/45; 706/46; 706/47; 706/48; 706/49; 715/205; 715/206; 715/207; 715/208; 715/209
(58) Field of Classification Search .................. None
See application file for complete search history.

(56) References Cited

U.S. PATENT DOCUMENTS

| | | | |
|---|---|---|---|
| 6,581,062 B1 * | 6/2003 | Draper et al. ............... | 707/100 |
| 6,901,403 B1 * | 5/2005 | Bata et al. .................... | 707/101 |
| 7,031,956 B1 * | 4/2006 | Lee et al. ....................... | 707/3 |
| 2003/0154204 A1 * | 8/2003 | Chen-Wright et al. ...... | 707/100 |

* cited by examiner

*Primary Examiner*—Christian P. Chace
*Assistant Examiner*—Farhan M Syed
(74) *Attorney, Agent, or Firm*—Baker Botts L.L.P.

(57) ABSTRACT

A system, apparatus and method are provided that enable the receipt of answers to questions from users and to make those answers persistent within a generalized database schema. A set of one or more middleware entities and components are provided to process the user's answers that are submitted to the system. The middleware entities differentiate one user from another user by use of a session. Different sets of questions are grouped into encounters, and the answers to the questions for a particular encounter are given a unique identifier. The unique identifier can be used to identify the user and/or the particular encounter. The answers to the questions can be retrieved and viewed in numerous ways, such as by user, by encounter, by question, by question type, by answer, by answer type, etc. The selection of database schema and the structure of the middleware enables the system to handle any answer to any question without requiring the restructuring of the database or database schema.

20 Claims, 7 Drawing Sheets

CONFIGURABLE FRAMEWORK FOR STORING AND RETRIEVING ARBITRARY INFORMATION FROM A DATABASE

CROSS-REFERENCE TO RELATED APPLICATIONS

This application is a continuation of U.S. patent application Ser. No. 10/702,880 filed Nov. 6, 2003 now abandoned.

BACKGROUND OF THE INVENTION TECHNOLOGY

1. Field of the Invention

The present invention is related to databases. More particularly, the present invention is related to a system and method for storing ad-hoc information within a single database table without compromising the disparity and type of information provided by the user.

2. Description of the Related Art

The advent of the Internet, particularly the World Wide Web ("WWW"), heralded the advent of ubiquitous technologies that link people and information. With the proliferation of dynamically generated hypertext markup language ("HTML") by application servers and other web technologies, many types of user interaction problems, such as those encountered with traditional client-server applications, were solved.

Many web-based software applications utilize a web server in conjunction with a relational database and intermediate software ("middleware") that retrieves the information from the database and places it into a form needed by the web server to generate the response to the user. Users typically access the web-based application by entering a universal resource locator ("URL") into their web browser, and send the request to the web server. The web server satisfies the request in one of two general ways: return a static web page; or generate a dynamic web page. Dynamic page generation typically requires access to a relational database. The relational database contains information that is stored in one or more fields (columns) about specific instances (rows) within a table. One or more rows are typically retrieved in a database request that is issued by the web server. The information from the database's response is used to generate the dynamic web page. Consequently, most moderate and large web applications can be broken down into three fundamental components:

1. The view and its support utilities, i.e. the front-end or user-interface, is typically a set of web pages generated by JavaServer Pages ("JSP's"), common gateway interface ("CGI") code or Application Server Pages ("ASP's") that are presented to the client or other applications by a suitable server that is a consumer of middleware functionality. Java Server Pages technology can be obtained from Sun Microsystems of Santa Clara, Calif. Application Server Page technology is available from the Microsoft Corporation of Redmond, Wash.
2. Middleware is the application code that encapsulates the systems business logic. Middleware is also responsible for persisting and retrieving data from a persistence store.
3. A persistence layer is responsible for long-term storage of application and user data. Typically the persistence layer consists of a database but could also be as simple as a file system.

In the case of a presenting a series of new questions via a web application using a database and typical middleware, the database developer must create table space to capture the answers for each question. Table space creation could have been as simple as modifying existing tables to accept extra fields, or as complicated as creating new tables and integrating them into the existing schema's integrity constraints. For the middleware, the system architect and the developer must design and implement components that enforce business logic for the new types of data. Furthermore, new methods must be exposed to the view and the new components must be integrated into the persistence process.

While changes to web-based applications are easier to implement than client-server applications, web-based content for software applications is still typically hard coded and therefore requires complete rewrites of the front end (user-interface) when significant changes are made to the middleware and database. Similarly, even minor changes to the type of information gathered via the user-interface can require significant modification of database schema used to support the web-based user-interface. Such modifications are expensive, both in terms of money and in time. Modifications are expensive because once the structure (schema) of the database is set, it is difficult to modify without causing significant "ripple" effects in both the middleware and the user interface and vise-versa.

The Extensible Markup Language ("XML") is a processing standard proposed by the World Wide Web Consortium ("W3C"), the same group responsible for overseeing the HTML standard. XML is expected to replace HTML as the markup language of choice for dynamically generated content, including non-static web pages. XML is a meta-language that enables the creation and formatting of arbitrary document markups called elements. Each of the elements can be defined through a document type definition and/or a stylesheet and applied to one or more XML documents. Elements within XML can contain other elements. Elements that are embedded within other elements can be described in a hierarchical manner (i.e., parent-child relationships between elements). XML documents are typically stored on a standard file system.

In the prior art, which is exemplified by the book "Professional XML Databases" by Kevin Williams, et al (Wrox, December 2000), the hierarchical structure of elements within an XML document do not lend themselves to storage within a relational database. Proper administration of relational databases require the "normalization" of the information, and the sequestering of unique types of information into specific columns within the database tables. For example, a field could contain a person's last name, and such a field may be called "last_name." It would be improper to place the person's first name within the last_name field because it would diminish the value of the database if the end-users of the database had to consider or filter first names from the last name field. Consequently, when a different type of information is needed, a new field within one of the database tables must be created, and that field must be linked to the user interface with changes to the middleware and/or user-interface. Such changes are, as mentioned above, expensive both in terms of time and in terms of out-of-pocket expenses. There is, therefore, a need in the art for a system and method that enables a web-based (or other) user-interface to be modified to accommodate new or ad-hoc information without requiring modification to the middleware or to the database tables or to the underlying database schema.

SUMMARY OF THE INVENTION

The present invention remedies the shortcomings of the prior art by providing a system and method for storing information within a relational database that enables the capture and storage of ad-hoc information without requiring a restructuring of the database tables.

The system of the present invention includes a set of one or more components that contain one or more entities, each of the entities may contain zero or more properties and methods. The components, entities, methods and properties are constructed and arranged onto an information handling system to service requests from a user that interacts with the system through a system client.

The present invention can be implemented as a data storage apparatus on an information handling system that includes: one or more nodes entities or components; one or more tree root entities or components that reference the nodes entities; and one or more parent-child link entities that are linked to the nodes entities; wherein the entities or components store a set of information that has elements related to other elements within the set. Alternatively, the present invention can be a data storage apparatus that is implemented on an information handling system that includes: one or more question nodes entities or components; one or more tree roots entities or components that reference the question nodes entities or components; one or more parent-child link entities or components that are linked to the nodes entities/components; and one or more question answer entities or components that map with the question nodes object or component, wherein the entities and/or components store a set of information having elements that are related to other elements within the set.

Alternatively, the present invention can be a data storage apparatus that is implemented on an information handling system including: one or more question nodes entities; one or more tree roots entities that reference the question nodes entities; one or more Parent-child link entities linked to the nodes entities; one or more question answer entities that map with the question nodes object; and one or more user answer entities that are associated with the question nodes object; wherein the various entities store a set of information having elements related to other elements within the set.

BRIEF DESCRIPTION OF THE DRAWINGS

A more complete understanding of the present disclosure and advantages thereof may be acquired by referring to the following description taken in conjunction with the accompanying drawings wherein.

Figure 1:
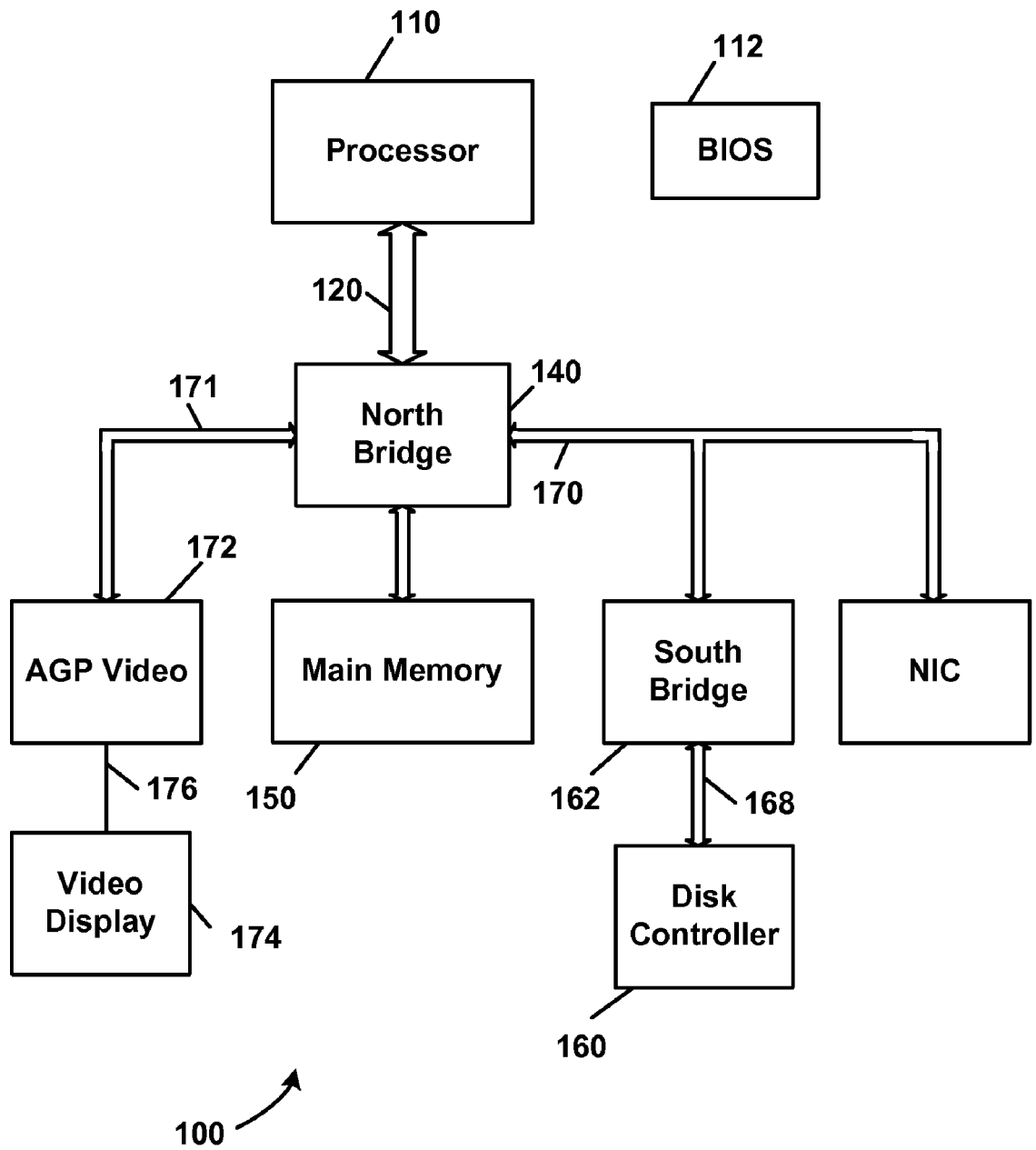
FIG. 1 is a schematic diagram illustrating an information handling system according to the teachings of the present invention.

The present invention may be susceptible to various modifications and alternative forms. Specific embodiments of the present invention are shown by way of example in the drawings and are described herein in detail. It should be understood, however, that the description set forth herein of specific embodiments is not intended to limit the present invention to the particular forms disclosed. Rather, all modifications, alternatives and equivalents falling within the spirit and scope of the invention, as defined by the appended claims, are to be covered.

DETAILED DESCRIPTION OF SPECIFIC EMBODIMENTS

The present invention is directed to a system and method for storing ad-hoc information on a computer system without requiring the modification of the underlying application schema, database, and/or middleware.

Information Handling System

FIG. 1 illustrates an information handling system that is capable of implementing the entities, properties, methods, signals, messages and components of the present invention. Referring to FIG. 1, the information handling system is illustrated having electronic components mounted on at least one printed circuit board (PCB) (motherboard) and facilitating the communication of data and control signals over signal buses. In one embodiment, the information handling system is a computer system. The information handling system, generally referenced by the numeral 100, comprises one or more processors 110 coupled to a host bus 120. A north bridge 140, which may also be referred to as a memory controller hub or a memory controller, is coupled to a main system memory 150. The north bridge 140 is coupled to the system processor 110 via the host bus 120. A basic input/output system (BIOS) 112 comprises firmware used during start-up of the information handling system 100, and for system hardware housekeeping functions. The BIOS 112 may be any non-volatile memory, e.g., electronically erasable read only memory (EE-PROM) or FLASH memory.

The north bridge 140 may be generally considered an application specific chip set that provides connectivity to various buses, and integrates other system functions such as a memory interface. For example, an Intel 120E and/or 115E chip set, available from the Intel Corporation of Santa Clara, Calif., provides at least a portion of the north bridge 140. The chip set may also be packaged as an application specific integrated circuit ("ASIC"). The north bridge 140 typically includes functionality to couple the main system memory 150 to other devices within the information handling system 100. Thus, memory controller functions such as main memory control functions typically reside in the north bridge 140. In addition, the north bridge 140 provides bus control to handle transfers between the host bus 120 and a second bus(es), e.g., PCI bus 170, and an AGP bus 171 coupled to a AGP graphics interface 172 which drives a video display 174 via a signal transmission mechanism, such as cable 176.

The PCI bus 170 couples at least one PCI device, e.g., compliant with the PCI Bus Power Management Interface Specification, to the north bridge 140. A second bus(es) 168 may also comprise other industry standard buses or proprietary buses, e.g., ISA, SCSI, USB buses through a south bridge (bus interface) 162. These secondary buses 168 may have their own interfaces and controllers, e.g., ATA disk controller 160 and input/output interface(s) (not shown).

Organization of Information

Figure 2:
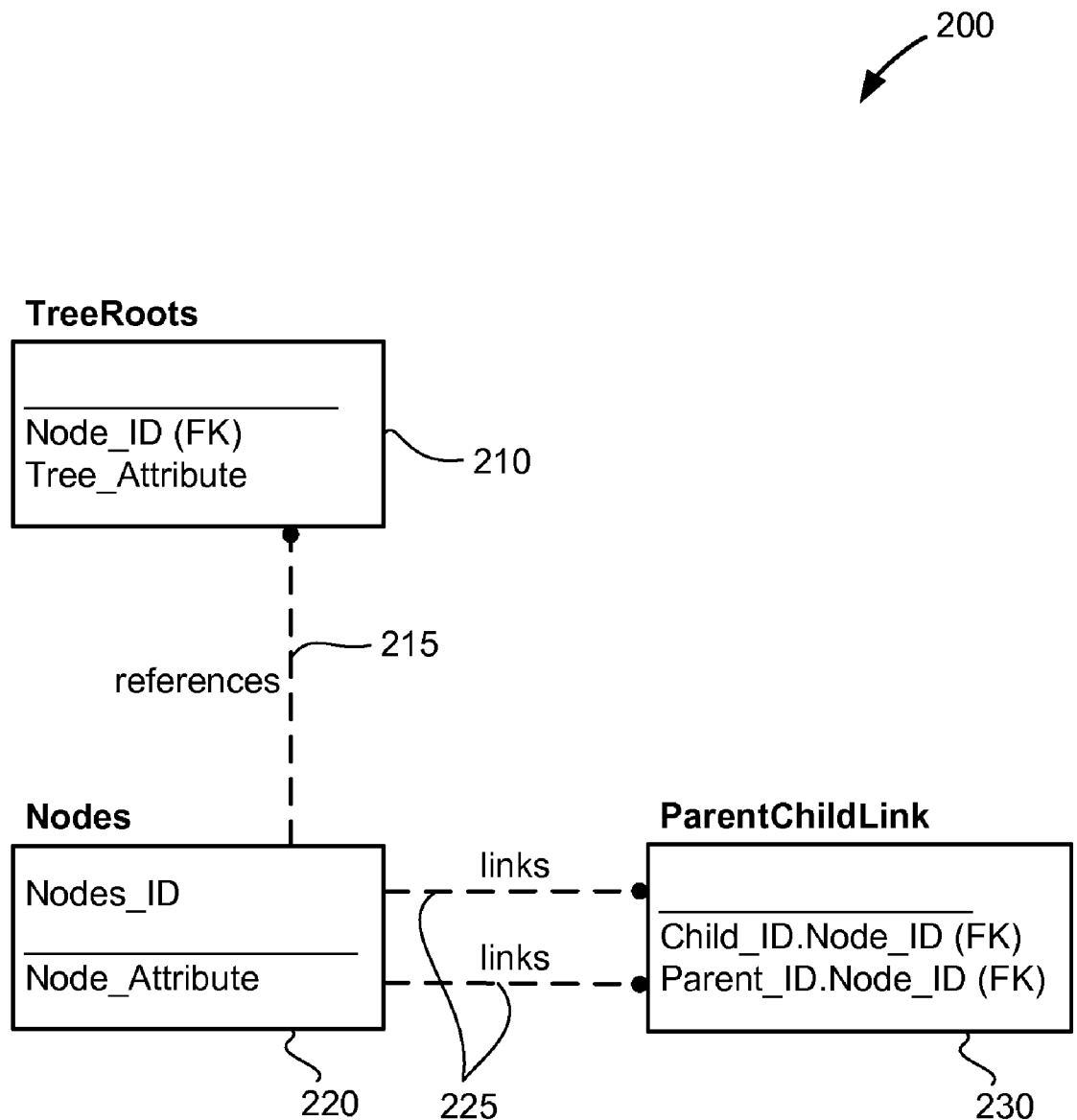
FIG. 2 is an entity relationship diagram illustrating the basic data structure according to the teachings of the present invention.

The present invention stores information in a data structure that facilitates the operation of the present invention. In its simplest embodiment, the present invention stores data in three types of entities and relationships as shown in the entity relationship diagram of FIG. 2. The entities of FIGS. 2 and 3 can be implemented as tables in a relational database, with each table having columns representing the attributes of the entity, and rows representing various instances of the entities. For the present invention, an entity is something about which we wish to keep information, so entities typically have one or more attributes that contain aspect information about the thing being represented by the entity. This information can be made persistent through the use of a database. Relationships between the data tables are typically represented by references 215 or links 225 as shown in FIG. 2. The relationships can consist of keys, such as primary keys and foreign keys, or some other relationship mechanism that is available on the database used to implement the present invention.

Central to the data schema 200 is the nodes entity 220. Occurrences of the nodes entity 220 (e.g., rows of the data table) contain a preferably unique identifier (Nodes_ID) and one or more attributes (Node_Attribute) that can be used to store information and information-types that tailor the specific occurrence of the nodes entity 220 to a particular problem. One or more occurrences of the tree root entity 210 can reference 215 a particular occurrence of the node entity 220 of the database via, for example, the node identifier (Node_ID) that exists in both entities.

The present invention can use a variety of databases, including relational databases (where entities are represented as a row in a particular table or rows in a set of tables), object databases (where the entities are represented directly), object-relational databases (where the entities are typically mapped to a relational database), or other types of databases that can have constituent elements be represented by software objects, tables, structures, or similar models. If a relational database is used to persist the data, then the node identifier (Node_ID) of the tree root entity 210 would be a foreign key (as noted by the designation "FK" in FIG. 2). Moreover, parent-child relationships between occurrences of the node entity 220 and occurrences of the tree root entity 210 can be identified by the use of occurrences of the parent-child link entity 230 through links 225 to the node entity 220 as illustrated in FIG. 2. The parent-child link entities 230 provide the relationships between the various occurrences of the nodes entity 220 and the various occurrences of the tree root entity 210. However, it is often preferable for each occurrence of the tree root entity 210 (such as a row in a table within the relational database) to contain an explicit identifier for the top (root) node occurrence so that the particular occurrence of the tree root does not require the use of a linking entity such as the parent-child link entity 230. If needed, however, occurrences of the parent-child link entity 230 may contain the identifiers of the various occurrences of the tree roots entity 210 and the occurrences of the nodes entity 220 via, for example, variables/parameters such as "Child_ID.Node_ID" and "Parent_ID.Node_ID" as illustrated in FIG. 2. Alternatively, if an object database is used, the object databases standard facility for handling relationships can be used, thereby eliminating the need for the parent-child link entity 230.

Both the occurrences of the nodes entity 220 and their associated occurrences of the tree roots entity 210 can be equipped to handle one or more attributes that enable the end-user or developer to tailor the tables of the database to real-world problems. Thus, the nodes entity 220 and the tree roots entity 210 can be structured with specific attributes for the real-world problem at hand. The embodiment of the present invention illustrated in FIG. 2 is useful for storing information, such as questions, within the nodes entities and/or the tree roots entities. Typically, the question for the user would be contained within the nodes object, although there are alternative arrangements of the information. For example, the questions can be contained within the tree roots object instances and can be associated with a particular category with the category information being stored within a Nodes object instance. Although discouraged, the specific tree roots entity 210 can be associated with one or more entries within nodes entity 220 when, for example, the question involved is applicable to one or more categories.

Figure 3:
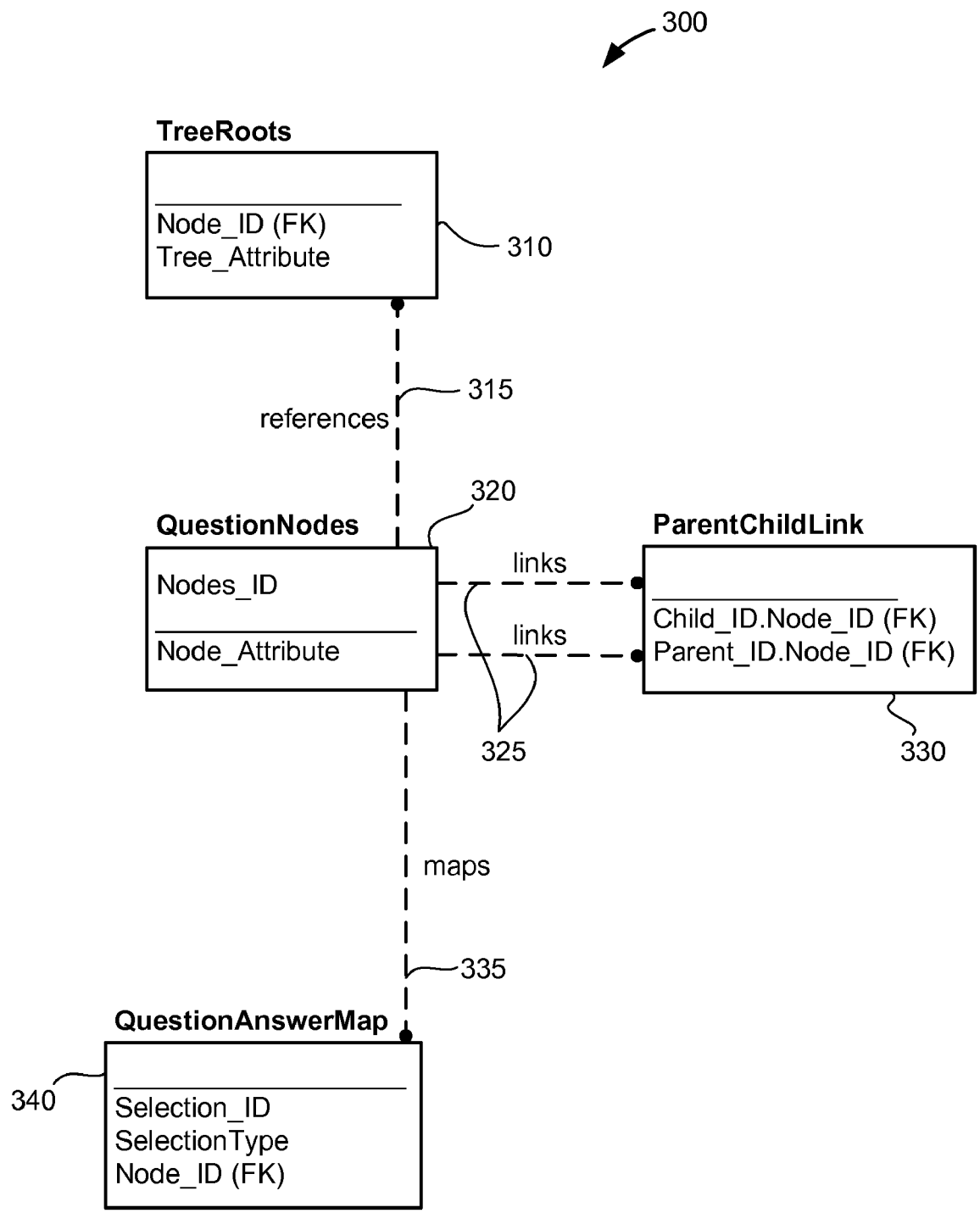
FIG. 3 is an entity relationship diagram illustrating an alternate embodiment of the data structure according to the teachings of the present invention.

An alternate embodiment of the data storage mechanism of the present invention is illustrated in FIG. 3. FIG. 3 is very similar to FIG. 2, except that the database schema 300 of FIG. 3 has the addition of a question-answer map entity 340. As with the typical embodiment of FIG. 2, the question nodes object 320 is typically used to store a question or some other "centralized" piece of information to which other pieces of information are associated. As illustrated in FIG. 3, the question nodes 320 are associated 335 with one or more entries within the question-answer map entity 340. The question-answer map entity 340 has, for example, a preferably unique identifier (Selection_ID), and a parameter (SelectionType) that identifies the type of question and/or answer involved. Finally, the question-answer map entity 340 has a parameter to identify the question nodes entity 320 to which the former refers. As with the database 200 of FIG. 2, the database of FIG. 3 can have one or more entries within the tree roots entity 310 that reference 315 one or more entries in the question nodes entity 320. Similarly, one or more entries in the parent-child link entity 330 can be linked 325 to entries within the question node entity 320 in order to identify parent child relationships.

The advantages of the present invention can be illustrated with the following example. In this example, a patient will be asked a series of questions about their health, and in particular, their eyes. Already one can say that whatever questions are asked belong to the set of questions related to eyes, such as an eye exam. The process of questioning the patient is called an encounter. "Eye Exam" could be the name of the encounter and one of the entries for the tree roots table 310 for that encounter could be called "Eye Pain." For example, "Eye Pain" could be the value of the attributes (Tree_Attribute) for the entry of the TreeRoots table 310. The first question that is posed to the patient is from an entry in the QuestionNodes entity 320 (the question node referenced by this instance of the TreeRoots entity 310) is: "Does your eye hurt?" The next question that is posed to the patient is found by looking through all of the ParentChildLink entities 330 to find the entries that contain a reference to the question that was just asked as a parent of the parent-child pair. It is possible to find one or more entries that satisfy the condition, and they would reference another question node as a child (of the parent-child pair) which, when found in the entity where the question nodes are stored, has the question text "Which eye?" Thereafter, the ParentChildLink entity 330 is checked again for instances referencing this (most recent) question as a parent and so on.

Encounters are logical collections of TreeRoot entities 310. TreeRoots entities 310 are logical collections of questions organized as trees with a single top level question contained by the actual TreeRoot instance within the TreeRoot entity 310. Questions are logical collections of selections which are linked to their questions by the QuestionAnswerMap entity 340 in a similar manner as the ParentChildLink entity 330. The QuestionAnswerMap entity 340 is important for decoupling the questions from their selections. The QuestionAnswerMap entity 340 is a lookup entity that is similar to the ParentChildLink entity 330. However, in this scenario, two parameters are needed to uniquely associate a selection with a question. The selection type essentially specifies a location or an address where the particular selections can be found. The Selection_ID identifier uniquely identifies a selection at the location/address specified. In the simplest case, the type could be a table name and the identifier would be a primary key. In this way, the selections offered to the end user could be varied widely in source and type without affecting the basic framework of the present invention, i.e., the questions themselves. As an example, one could offer the user multimedia as part of a selection's attributes by simply adding associated records to the QuestionAnswerMap entity 340 that links the appropriate question to a source of images, sound files, movies, and the like. Moreover, UserSelection entity 460 of FIG. 4 (see description below) makes use of the same mechanism to associate a user's chosen selections to the answer of a particular question.

Figure 4:
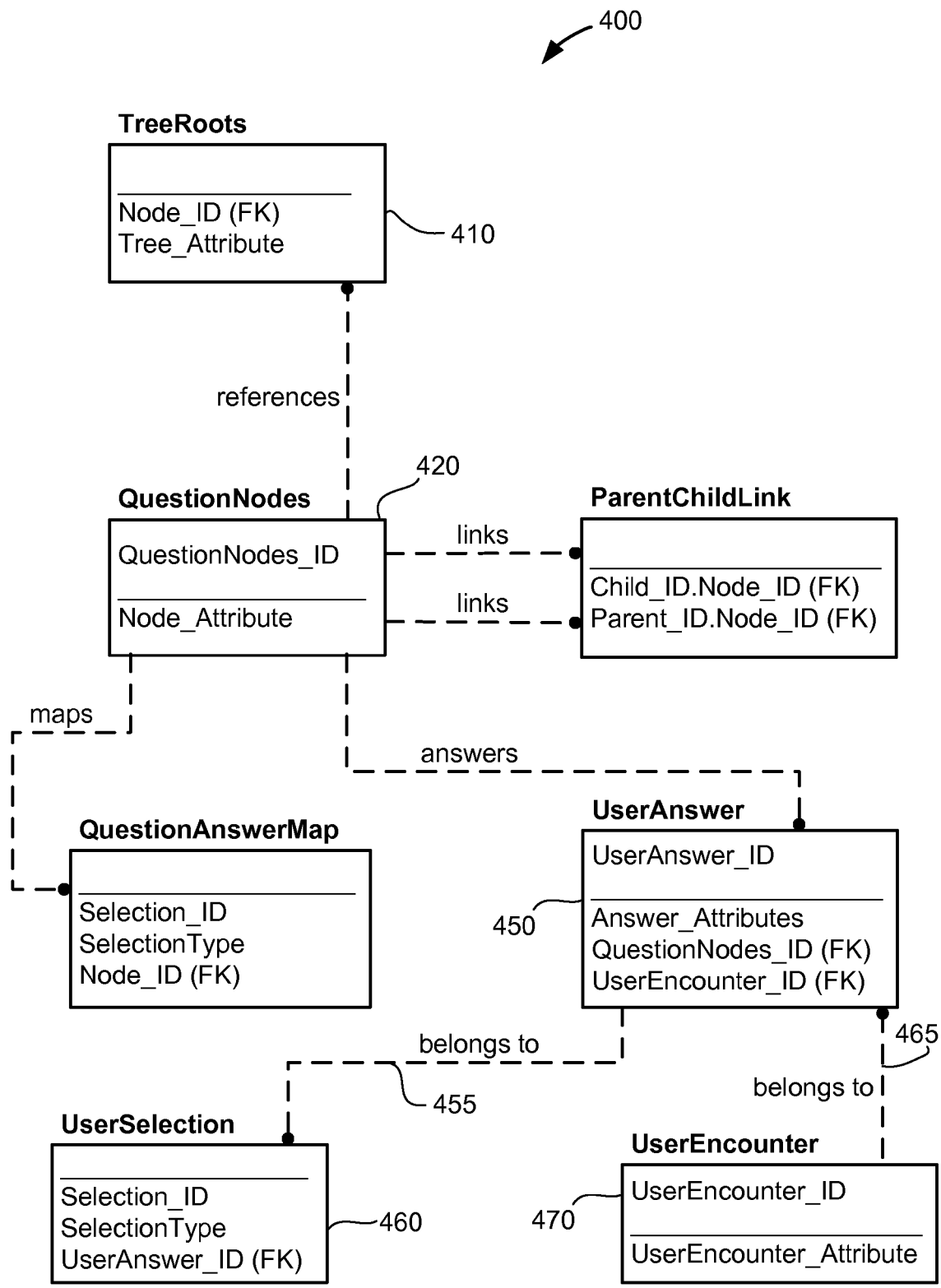
FIG. 4 is a block diagram illustrating another alternate embodiment of the data structure according to the teachings of the present invention.

Yet another alternate embodiment of the present invention is illustrated in FIG. 4. The alternate embodiment 400 of FIG. 4 has all of the elements of the database 300 of FIG. 3. However, the database 400 has additional elements as illustrated in FIG. 4. For example, three additional entities are included in the database 400. This embodiment of the present invention illustrates the use of the database 400 as a mechanism for persisting answers to questions. The questions are preferably stored separately in rows within the question nodes entity 420. For this purpose, the rows of the question nodes entity 420 have a (preferably) unique identifier (QuestionNodes_ID) and one or more attributes that are used to specify and/or display the question to a user (Node_Attributes). The user's answer/response is stored in a user answer entity 450 as illustrated in FIG. 4. The database 400 can contain a multitude of rows (entries) within the user answer entity 450 as well as a plurality of rows within the tree roots entity 410 that can be used to store the questions, question segments, or other types of information regarding the structure of the question, or the question's place within a form of questions. Preferably, the questions can be stored in the question nodes entity 420 and the UserAnswer entity 450 can reference the particular entry within the question nodes entity 420 by use of the question nodes identifier that would be a foreign key (if a relational database were employed).

Still other entities can be added to the database mechanism of the present invention as illustrated in FIG. 4. For example, an entity that can contain selections to answer the questions by the user (user selection entity 460) can be linked 455 to a particular user answer entity 450. Similarly, an entity that stores information about the user's experience in a question/answer session or sessions can be stored as an entry in a user encounter entity 470 with one or more answer entries associated 465 with a user encounter entity 470.

Figure 5:
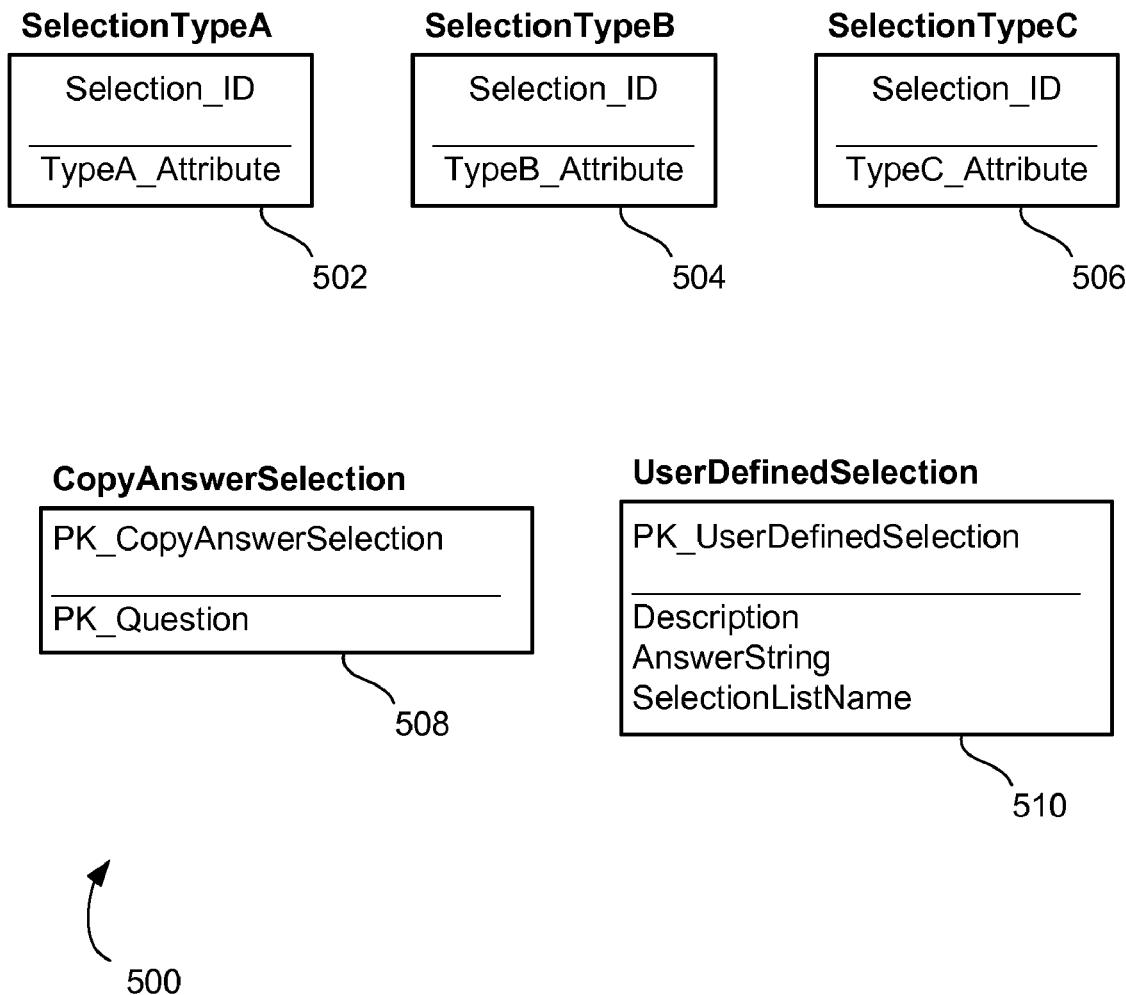
FIG. 5 is a block diagram illustrating selection types according to the teachings of the present invention.

FIG. 5 illustrates examples 500 of entities that can be used to denote the type of selection (response) that a user can make to a question. Selection type A entity 502, selection type B entity 504, selection type C entity 506 are generic entities that can satisfy the selections for users. Typically, one selection-type entity is used for each selection available to the user, although a generic entity could be used that satisfies the various requirements of the different types. Examples of specific selection-type entities are the copy answer selection entity 508 and the user defined selection entity 510. Each of the selection-type entities can be constructed and arranged with an identifier (such as Selection_ID or PK_CopyAnswerSelection). Similarly, the selection-type entity can be identified with a particular question by use of, for example, a PK_Question parameter as in the copy answer selection entity 508. Other information can also be retained within the selection-type entity, such as a description of the selection (Description), the character string containing the particular answer selection (AnswerString), and an identifier denoting the particular set of answers string (SelectionListName) that the particular answer string is associated. As with all other entities associated with the present invention, other parameters/properties/variables may also be included within various selection-type entities for use with the present invention. The entities described above can thus be used within one or more databases wherein the entities store a set of information, and the set of information has elements of information that are related to other elements within the set of information.

All of the databases 200, 300, and 400 of FIGS. 2, 3, and 4, respectively, can be implemented on the information processing system 100 of FIG. 1. Similarly, the information processing system of FIG. 1 can be configured in innumerable ways to accommodate the problems that may be solved with the present invention. For example, multiple processors 110 may be used, or the information system 100 may be linked or clustered with other like or similar systems to increase processing capacity and/or storage. In addition, the information system 100 that implements the database 200, 300, 400 of the present invention may be linked to a network, such as a local area network and/or a wide area networks, e.g. the Internet. The information handling system 100 therefore can be of any configuration that supports the processing and bandwidth needs of the users accessing the database 200, 300, 400.

Operation of the Present Invention

While the present invention is well suited to handling the persistence and dissemination of question/answer forms on a web-based system and other systems. Moreover, the invention is also useful for other applications, particularly where one initial set of information needs to be linked or associated with other sets of information in a persistent manner. The following is a description of one implementation of the present invention.

Figure 6:
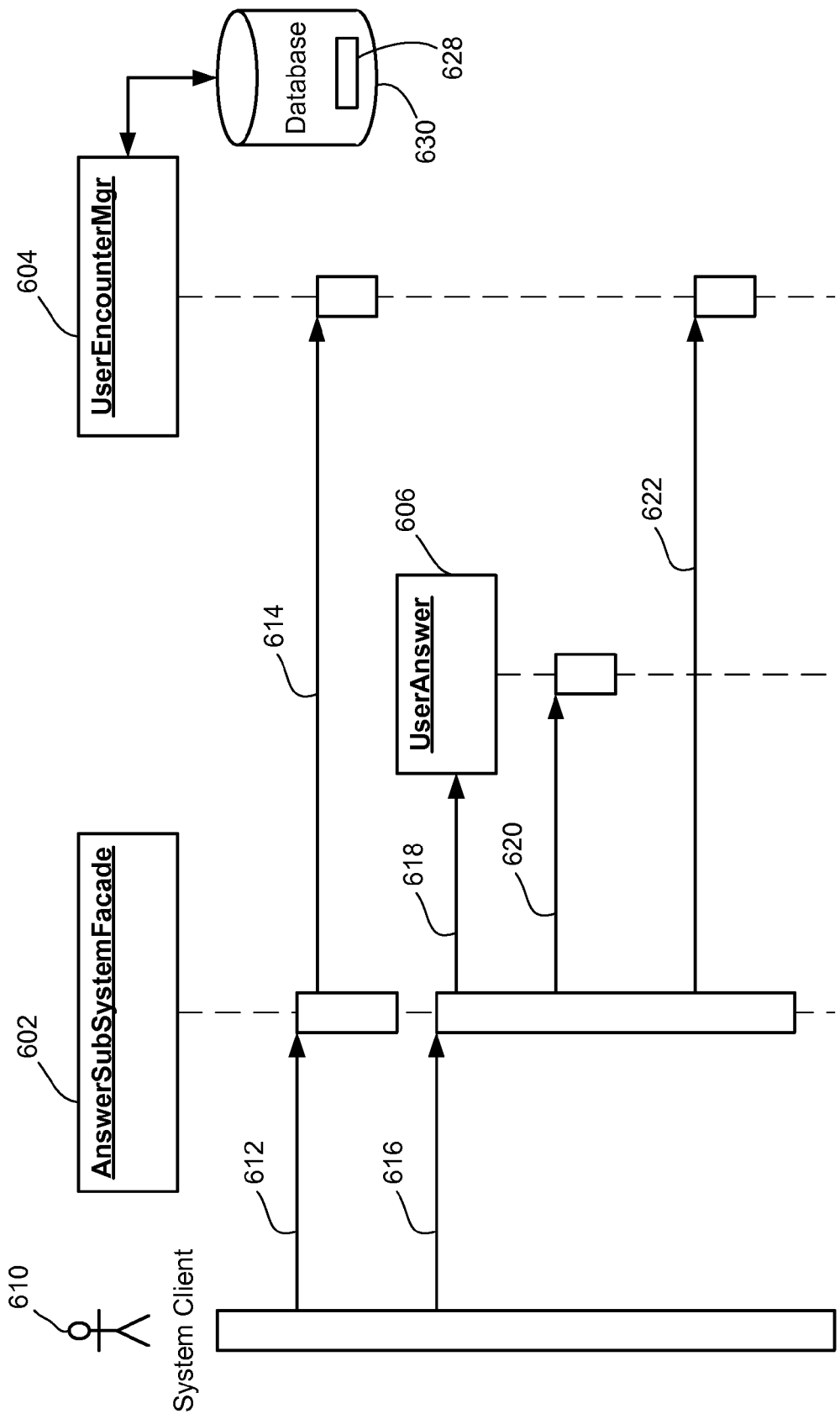
FIG. 6 is a block diagram illustrating an answer submission implementation according to the teachings of the present invention.
Figure 7:
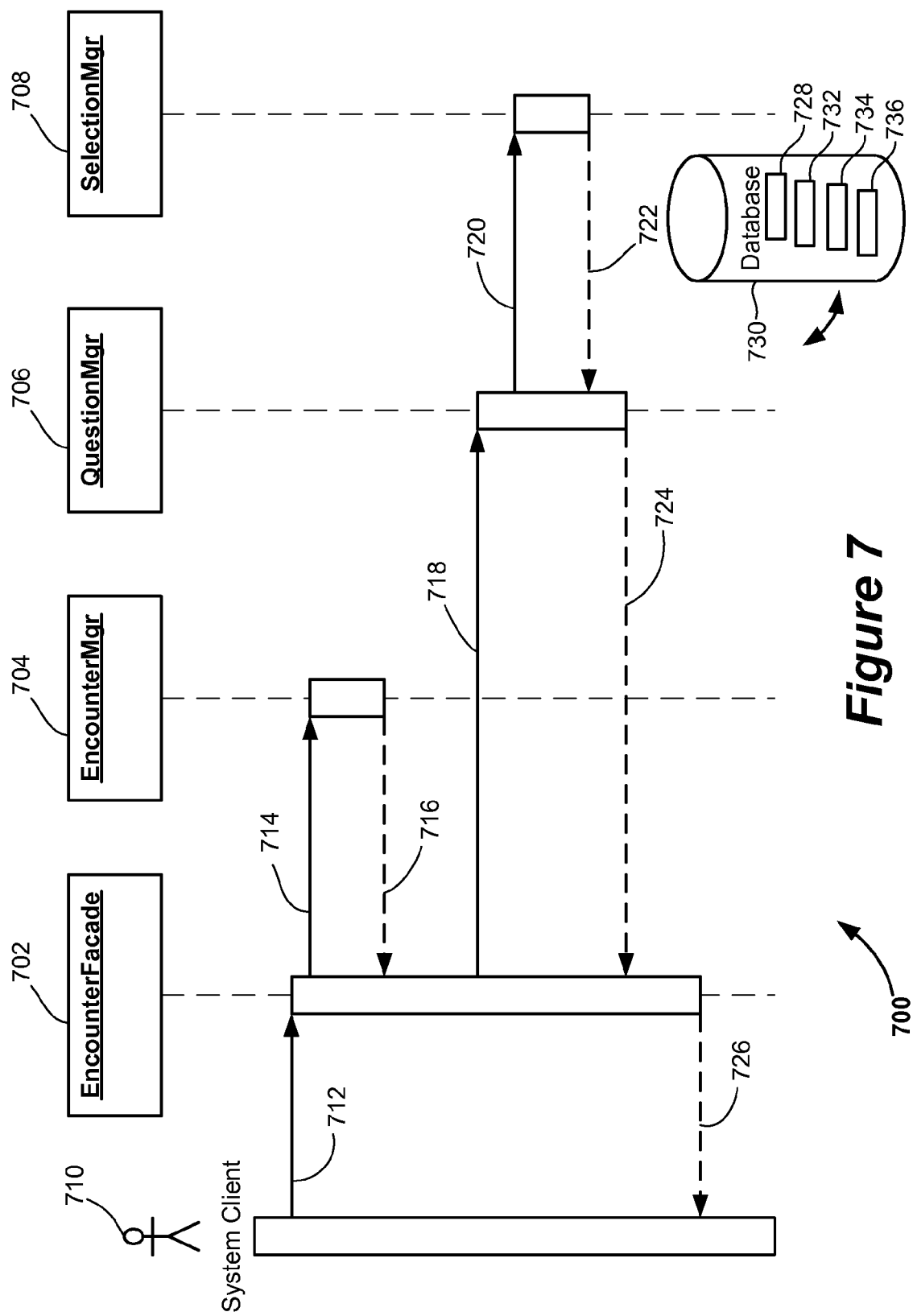
FIG. 7 is a block diagram illustrating a question retrieval implementation according to the teachings of the present invention.

This implementation of the present invention has two principal aspects: question and answer. The purpose of this particular implementation is the storage and retrieval of user's answers to questions that are posed via a web-based application. FIG. 6 illustrates the answer submission implementation. FIG. 7 illustrates the question retrieval implementation. Both of the implementations can be implemented on the information handling system of FIG. 1 using entities and components derived from the entities and components illustrated in FIGS. 2-5.

Referring to FIG. 6, the answer implementation 600 uses an answer subsystem facade component 602 that can receive signals from a system client 610. In this scenario, the user is answering a set of questions associated with a given "encounter." The encounter is typically associated with a particular category or subset of questions. The system 600 enables the users to answer sets of one or more questions that are related to a particular encounter. One or more users can answer the questions associated with a given encounter, and one user can answer questions related to one or more encounters.

The system client 610 is typically (although not always) a personal computer (not shown) that is connected via a network such as the Internet to the information handling system 100. The answer subsystem facade component 602 is used as an intermediary between the system client (user) 610 and the present invention. The subsystem facade component 602 is used to simplify the user's interaction with the present invention. The answer subsystem facade 602 intercepts and forwards to the relevant sub-components, all of the requests pertaining to answer persistence from the system client 610. Typically, the system client 610 sends a register-user signal 612 to the answer subsystem facade 602 in order to begin a session that will wrap the system client's 610 answers into the proposed encounter's set of questions. The answer subsystem facade component 602 will, in turn, invoke a create new user session method 614 of the user encounter manager component 604 that causes the latter to create an entry in a user encounter database table 628 within the database 630 that uniquely identifies the user's set of answers to the given encounter. In this embodiment of the present invention, the user encounter manager 604 is a component that is responsible for maintaining the integrity of the system client's 610 answers for a given encounter. The user encounter manager 604 associates a preferably unique identifier for the system client's 610 interaction with the system 600 to ensure separation of the user's answers from the answers of other users and the ability to differentiate therefrom.

Once the user's session has been initiated, the user (through the system client 610) may start submitting answers to the system 600. The system client 610 invokes a submit answer method 616 of the answer subsystem facade component 602. The submit answer method 616 is the main method that a system client 610 calls to submit an answer in response to a given encounter's question. The selections that make up an answer are determined by the question that the user is answering. After the user has submitted their answer or answers, the answer subsystem facade component 602 invokes a create user answer method 618 to create an instance of the user answer entity 606, the user answer entity 606 being a member of the user answer class 450 of FIG. 4. The user answer entity 606 temporarily holds the answer information that was submitted by the system client 610. Thereafter, the answer subsystem facade component 602 can invoke the add selections method 620 to populate the user answer instance 606 with the set of selections that the user chose for the given question. Finally, the answer subsystem facade component 602 can invoke the add answer to user session method 622 of the user encounter manager 604 to provide the answers that were forwarded by the system client 610 for the encounter to the database 630 associated with the user encounter manager 604. Preferably, the add answer to user session method 622 extracts the attributes from the user answer instance 606 and creates an entry in the user answer table of the database 630 with the user's session's unique identifier. If multiple sessions are a part of the answer, then individual entries are inserted into the user selection table 628 of the database 630.

FIG. 7 illustrates a question retrieval embodiment 700 that can be implemented on the information handling system 100 of the present invention. As before, the user interacts with the system 700 through a system client 710, such as a personal computer, personal digital assistant, or some other communication device that contains an application which is a consumer set of questions that are configured for a given "encounter." The system client 710 is used for displaying questions and their possible answers to one or more users, and for forwarding the user's answers to the system 700. In this embodiment of the present invention, an encounter is a set of questions (such as a group of question trees) that are logically grouped to gather information for a particular purpose. Other uses of the present invention are possible, however.

The system client 710 interacts with an encounter facade 702, which is typically a component that functions as a facade for the system client 710. The encounter facade 702 orchestrates calls to other components within the system 700 (or other external systems) in order to assemble the encounter for presentation to the system client 710. For example, the encounter facade 702 can interact with the encounter manager 704, the question manager 706, and the selection manager 708 as illustrated in FIG. 7.

Various properties and methods are available to the components 702, 704, 706, and 708 that facilitate the implementation of the present invention. For example, the encounter manager 704 is a component that uses the tree roots table 728 of the database 730 in order to assemble all of the question identifiers that serve as root nodes of a specific encounter. The question manager 706 is a component that utilizes the question nodes table 732 and the parent-child link tables 734 along with the selection manager 708 to assemble all of the questions and corresponding selections that are nodes under a given root node. The selection manager 708 is a component that, upon receiving a question identifier, uses a question answers map to return all of the selections that are configured for the question that is represented by the question identifier. The above-identified components and entities can be assembled, for example, by use of the tree roots entity 210 (for the given root node) and nodes entities 220 that have links 225 to the parent-child link table 230 as illustrated in FIG. 2. Similarly, the question answer map used by the selection manager 708 can be derived from the question-answer map entity 340 of FIG. 3. Moreover, constituent elements of FIG. 7 as described above can be used in conjunction with the constituent elements of FIG. 6 as illustrated in FIG. 4 to form a complete question/answer system.

Inter-component messages can be exchanged between components as illustrated in FIG. 7. For example, the system client 710 generates a present encounter signals 712 to the encounter facade 702 to request the set of questions and selections that are associated with a given (desired) encounter. Similarly, a signal can be issued to invoke a get tree root for encounter method 714 that causes the encounter manager 704 to query the tree roots table 728 of the database 730 to find all of the root nodes that are configured for a given encounter. The identities of the root nodes are then conveyed 716 to the calling component, which in this embodiment is the encounter facade 702. The encounter facade 702 can also issue a signal to invoke the get all questions in a tree method 718 that is called in order to receive all of the questions nodes in a tree from a given node on down the tree. The child of the given node is found from the parent-child link table 734 by querying the table for all of the child identifiers with a given parent identifier. Once a child identifier is found, then the question node that is associated with the child identifier can be found from the question nodes table 736 of the database 730. The get all questions in tree method 718 can also be used by the encounter manager to retrieve all of the questions for an encounter when given the encounter's set of root nodes. Yet another method, get selections for question 720 can be issued to the selection manager 708 as illustrated in FIG. 7. Typically, the get selections for question method 720 uses the question identifier to find the associated entries in the question answer map table 736 of the database 730. The entries that are found in the question answer map table 736 determine the selection types (see, e.g., selection types 502, 504 and 506 of FIG. 5) and selection identifiers (Selection_ID) of possible answers for the questions. The selection type determines which selection type table 736 to use and the selection identifier uniquely identifies an entry in the selection type table 736 to return. The returned value 722 is sent back to the requesting component, which in this embodiment is the question manager 706. The question manager 706 then uses the returned value 722 to formulate its response 724 to the encounter facade 702, which, in turn, formulates the response 726 to the system client 710.

It will be understood by those skilled in the art that alternate arrangements and/or combinations of components, entities, objects, methods and properties can be made to provide the same functionality described above with equivalent effect. Similarly, the constituent elements that provide the functionality described herein can be implemented in hardware as well as software, or any combination of hardware and software. The embodiments described above are illustrative, and are not intended to indicate the only possible arrangement of constituent elements. Instead, the above-described embodiments illustrate the capabilities needed to accomplish the solution to the problem.

The invention, therefor, is well adapted to carry out the objects and to attain the ends and advantages mentioned, as well as others inherent therein. While the invention has been depicted, described and is defined by reference to exemplary embodiments of the invention, such references do not imply a limitation on the invention, and no such limitation is to be inferred. The invention is capable of considerable modification, alternation and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is to be limited only by the spirit and scope of the appended claims, giving full cognizance to equivalents in all respects.

What is claimed is:

1. A computer program, stored on a tangible computer-readable medium for storing a set of user answers, the computer program including executable instructions that cause a computer to:
   access a database that is characterized by a database schema, the database schema comprising:
      at least one root comprising a root attribute;
      one or more question nodes comprising a question attribute; and
      one or more selection nodes comprising a selection type, the selection type indicating a location of a selection item;
      one or more user encounter nodes; and
      one or more user answer nodes;
      wherein:
         each root is associated with one or more predetermined encounters;
         each root is linked to one or more of the question nodes;
         one or more of the question nodes are linked to one or more of the selection nodes; and
         each of the user answer nodes are linked to a user encounter node; and
   execute a user interface, wherein the user interface is configured to:
      initiate a user encounter node in the database;
      select one or more first predetermined encounters;
      for at least one of the first selected predetermined encounters:
         for one or more roots associated with the first selected predetermined encounter:
            for each question node associated with the root:
               present the question attribute associated with the question node;
               present the selection items associated with the selection nodes that are associated with the question node; and
               receive a user selection; and
               store the user selection as a first user answer in the database;
               link the first user answer with the user encounter;
      selecting one or more second predetermined encounters, based at least in part on a user selection received in response to a question attribute; and
      for one or more of the second selected second predetermined encounters:
         for one or more roots associated with the second predetermined encounter:
            for each question node associated with the root:
               present the question attribute associated with the question node;
               receive a second user answer;
               store the second user answer in the database; and
               link the second user answer with the user encounter;
               wherein the first user answer and second user answer have different data types.

2. The computer program of claim 1, wherein one or more predetermined encounters represents a unique topic.

3. The computer program of claim 1, wherein the executable instruction that cause the computer to selecting at least one predetermined encounter further cause the computer to:
   present the user with the root attributes associated with one or more predetermined encounters; and
   receive a user selection of one of the root attributes to select a predetermined encounters.

4. The computer program of claim 1, wherein the executable instruction that cause the computer to selecting at least one predetermined encounter further cause the computer to:
   display a plurality of predetermined encounters to the user in one instance;
   receive a user selection of one of the one or more predetermined encounters; and
   query the database to retrieve each root attribute associated with the selected predetermined encounter.

5. The computer program of claim 4, comprising further executable instructions that cause the computer to:
   display each root entity attribute retrieved from the root entity query;
   receive a user selection of one root entity attribute; and
   query of the database to retrieve each question node attribute associated with the question node identifier associated with the root entity attribute selected by the user; and
   display in a predetermined sequential order each retrieved question node attribute; and
   query the database to store answers to each of the question node attributes.

6. The computer program of claim 1, wherein each question node attribute is a unique question associated with the one or more predetermined encounters.

7. The computer program of claim 1, wherein at least one of the one or more of the predetermined encounters is associated with two or more root attributes.

8. The computer program of claim 1, wherein at least one selection type indicates image data.

9. The computer program of claim 1, wherein at least one selection type indicates character data.

10. An information handling system comprising:
one or more processors;
a memory storing executable instructions that cause at least one of the one or more processors to:
  access a database that is characterized by a database schema, the database schema comprising:
    at least one root comprising a root attribute;
    one or more question nodes comprising a question attribute; and
    one or more selection nodes comprising a selection type, the selection type indicating a location of a selection item;
    one or more user encounter nodes; and
    one or more user answer nodes;
    wherein:
      each root is associated with one or more predetermined encounters;
      each root is linked to one or more of the question nodes;
      one or more of the question nodes are linked to one or more of the selection nodes; and
      each of the user answer nodes are linked to a user encounter node; and
  execute a user interface, wherein the user interface is configured to:
    initiate a user encounter node in the database;
    select one or more first predetermined encounters;
    for at least one of the first selected predetermined encounters:
      for one or more roots associated with the first selected predetermined encounter:
        for each question node associated with the root:
          presenting the question attribute associated with the question node;
          present the selection items associated with the selection nodes that are associated with the question node; and
          receive a user selection; and
          store the user selection as a first user answer in the database;
          link the first user answer with the user encounter;
    selecting one or more second predetermined encounters, based at least in part on a user selection received in response to a question attribute; and
    for one or more of the second selected second predetermined encounters:
      for one or more roots associated with the second predetermined encounter:
        for each question node associated with the root:
          present the question attribute associated with the question node;
          receive a second user answer;
          store the second user answer in the database; and
          link the second user answer with the user encounter;
          wherein the first user answer and second user answer have different data types.

11. The information handling system of claim 10, wherein one or more predetermined encounters represents a unique topic.

12. The information handling system of claim 10, wherein the executable instruction that cause the at least one of the one or more processors to select at least one predetermined encounter further cause the at least one of the one or more processors to:
  present the user with the root attributes associated with one or more predetermined encounters; and
  receive a user selection of one of the root attributes to select a predetermined encounters.

13. The information handling system of claim 10, wherein the user interface is a web interface.

14. The information handling system of claim 10, wherein the executable instruction that cause the at least one of the one or more processors to select at least one predetermined encounter further cause the at least one of the one or more processors to:
  display a plurality of predetermined encounters to the user in one instance;
  receive a user selection of one of the one or more predetermined encounters; and
  query the database to retrieve each root attribute, associated with the selected predetermined encounter.

15. The information handling system of claim 14, the memory comprising further executable instructions that cause at least one of the one or more processors to:
  display each root entity attribute retrieved from the root entity query;
  receive a user selection of one root entity attribute; and
  query of the database to retrieve each question node attribute associated with the question node identifier associated with the root entity attribute selected by the user; and
  display in a predetermined sequential order each retrieved question node attribute; and
  query the database to store answers to each of the question node attributes.

16. The information handling system of claim 10, wherein each question node attribute is a unique question associated with the one or more predetermined encounters.

17. The information handling system of claim 10, wherein at least one of the one or more of the predetermined encounters is associated with two or more root attributes.

18. The information handling system of claim 10, wherein at least one selection type indicates image data.

19. The information handling system of claim 10, wherein at least one selection type indicates character data.

20. A method for storing a set of user answers, comprising:
  accessing a database that is characterized by a database schema, the database schema comprising:
    at least one root comprising a root attribute;
    one or more question nodes comprising a question attribute; and
    one or more selection nodes comprising a selection type, the selection type indicating a location of a selection item;
    one or more user encounter nodes; and
    one or more user answer nodes;
    wherein:
      each root is associated with one or more predetermined encounters;
      each root is linked to one or more of the question nodes;
      one or more of the question nodes are linked to one or more of the selection nodes; and
      each of the user answer nodes are linked to a user encounter node; and
  executing a user interface, wherein the user interface is configured to:
    initiate a user encounter node in the database;
    select one or more first predetermined encounters;
    for at least one of the first selected predetermined encounters:
      for one or more roots associated with the first selected predetermined encounter:

for each question node associated with the root:
    present the question attribute associated with the question node;
    present the selection items associated with the selection nodes that are associated with the question node; and
    receive a user selection; and
    store the user selection as a first user answer in the database;
    link the first user answer with the user encounter;
selecting one or more second predetermined encounters, based at least in part on a user selection received in response to a question attribute; and
for one or more of the second selected second predetermined encounters:
    for one or more roots associated with the second predetermined encounter:
        for each question node associated with the root:
            present the question attribute associated with the question node;
            receive a second user answer;
            store the second user answer in the database; and
            link the second user answer with the user encounter;
        wherein the first user answer and second user answer have different data types.

* * * * *